(12) United States Patent
Ur (10) Patent No.: US 9,112,942 B2
(45) Date of Patent: Aug. 18, 2015

(54) DYNAMIC MODIFICATION OF MEDIA STREAMS' QUALITY

(76) Inventor: Shmuel Ur, Shorashim (IL)

( * ) Notice: Subject to any disclaimer, the term of this patent is extended or adjusted under 35 U.S.C. 154(b) by 273 days.

(21) Appl. No.: 13/183,463

(22) Filed: Jul. 15, 2011

(65) Prior Publication Data

US 2013/0212223 A1    Aug. 15, 2013

(51) Int. Cl.
*G06F 15/16* (2006.01)
*H04L 29/06* (2006.01)

(52) U.S. Cl.
CPC .......... *H04L 65/601* (2013.01); *H04L 65/4084* (2013.01); *H04L 65/602* (2013.01); *H04L 65/80* (2013.01)

(58) Field of Classification Search
CPC .............. H04L 65/80; H04L 29/06027; H04L 65/4084; H04L 65/608; H04L 45/22; H04L 45/304; H04L 65/601; H04L 65/4048; H04L 65/602
See application file for complete search history.

(56) References Cited

U.S. PATENT DOCUMENTS

| 8,352,627 | B1* | 1/2013 | Mackie | 709/232 |
| 2004/0267952 | A1* | 12/2004 | He et al. | 709/231 |
| 2005/0002401 | A1* | 1/2005 | Coleman et al. | 370/395.4 |
| 2010/0235438 | A1* | 9/2010 | Narayanan et al. | 709/203 |
| 2012/0124172 | A1* | 5/2012 | Sparks | 709/219 |

* cited by examiner

*Primary Examiner* — Brian J Gillis
*Assistant Examiner* — Thao Duong
(74) *Attorney, Agent, or Firm* — The Law Office of Joseph L. Felber (57) ABSTRACT

A method, apparatus and computer program product useful for communicating media content, over a computerized network, in accordance with download duration time. One exemplary method may comprise receiving, by a client, a first portion of a media content having a first quality. In response to an indication from a user, a change of quality to a second quality is determined. The client receives a second portion of the media content having the second quality. Whereby received media content by the clients comprises portions having different qualities.

17 Claims, 4 Drawing Sheets

DYNAMIC MODIFICATION OF MEDIA STREAMS' QUALITY

TECHNICAL FIELD

The present disclosure relates to communication in general, and to transmitting of media streams, in particular.

BACKGROUND

With the increasing popularity of playing streaming audio and video over networks such as the Internet, there is plurality of methods to provide media streams to clients over networks.

A media stream comprises of multimedia data, such as images, video, audio or the like. A media stream may be downloaded in a streamlining manner. Additionally or alternatively, the media stream may be downloaded in a non-streaming manner, such as by downloading a file comprising the media stream.

Media streams may be compressed using lossy compression techniques so to reduce their size. Lossy compression techniques remove information from the media stream, thus reducing the quality thereof, but enabling a faster transmission of the media stream. U.S. Patent Publication 2010/0,189,183 entitled "MULTIPLE BIT RATE VIDEO ENCODING USING VARIABLE BIT RATE AND DYNAMIC RESOLUTION FOR ADAPTIVE VIDEO STREAMING" to Gu et al, which is hereby incorporated by reference, discloses a-priori compression of a media content into plurality of alternative qualities, and enabling switching therebetween during streaming of the media content, based on network conditions.

A user may potentially chose a between different compression versions of the same media stream, such as between a media stream of High Definition (HD) quality and between a Standard Definition (SD) quality. The decision of the user may be based on the different network conditions, and in particular download rate, and on a desired quality of the media stream. The user's decision is a-priori prior to downloading the media stream.

BRIEF SUMMARY

One exemplary embodiment of the disclosed subject matter is a computer-implemented method comprising: receiving, by a client, a first portion of a media content having a first quality; in response to an indication from a user, determining a change of quality to a second quality; receiving, by the client, a second portion of the media content having the second quality; and whereby received media content comprises portions having different qualities.

Another exemplary embodiment of the disclosed subject matter is a computer program product for enabling a user of a computerized device to select quality of media content, the computer program product comprising: program code stored on a non-transitory computer readable medium; wherein the program code is operative to display a Graphical User Interface (GUI) widget on a display of the computerized device, wherein the GUI widget is responsive to an indication from the user to change quality of the media content after a first portion of the media content have been downloaded, whereby the media content downloaded to a client comprising the first portion having a first quality and a second portion having a second quality.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

The disclosed subject matter is described below with reference to flowchart illustrations and/or block diagrams of methods, apparatus (systems) and computer program products according to embodiments of the subject matter. It will be understood that blocks of the flowchart illustrations and/or block diagrams, and combinations of blocks in the flowchart illustrations and/or block diagrams, can be implemented by computer program instructions. These computer program instructions may be provided to one or more processors of a general purpose computer, special purpose computer, a tested processor, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transient computer-readable medium that can direct a computer or other programmable data processing apparatus to function in a particular manner, such that the instructions stored in the non-transient computer-readable medium produce an article of manufacture including instruction means which implement the function/act specified in the flowchart and/or block diagram block or blocks.

The computer program instructions may also be loaded onto a device. A computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to enable a user to better control downloading of media content.

Yet another technical problem dealt with by the disclosed subject matter is to enable the user to change parameters effecting download speed and/or quality of media content during the downloading process.

One technical solution is to transmit segments of the media content, each potentially having a different quality. The media content may be segmented into several segments, each segment may be downloaded from a different version, thereby the downloaded media content may have a variable quality at different segments thereof. Before initiating download of a next segment, the version may be selected in accordance with user input.

Additionally or alternatively, the client may provide an indication from the user to change the quality being transmitted. In some exemplary embodiments, the user may indicate he would like the media content to be downloaded faster or slower, thereby changing quality of the downloaded version by a one unit with respect to a predetermined quality granule. Based on the user's indication, the version may be selected.

Yet another technical solution is to provide an indication to the user of the client upon change in its connectivity, such as when switching between a WiFi connection and a cellular data connection. The user may respond to the indication and change the size of the downloaded file (e.g., by changing the quality).

One technical effect of utilizing the disclosed subject matter is to enable a user to indicate his wish that the download would be completed sooner, without loss of data that was downloaded so far.

Another technical effect is to enable the user to better control his budget, as different network connections may be associated with different usage costs, which may depend on bandwidth utilization.

Yet another technical effect is to enable a user to control download speed at the expense of quality. Additionally, the control may be in a dynamic manner.

It will be noted that the disclosed subject matter related to transmission of data from one computerized device to another. The present disclosure focuses on a scenario in which a client, being used by a user, downloads media content from a server. However, the disclosed subject matter is not limited to this scenario and may apply to uploading of data from the client to the server, transmittal of media content from one user device to another user device, or the like. The "client" is therefore a computerized device that is operative to receive the media content.

In the present disclosure the term "download" refers to receiving data by a computerized device from a source over a computerized network. Thus, a server may be said to download data from a client, a first client may "download" data from a second client, or the like.

Figure 1:
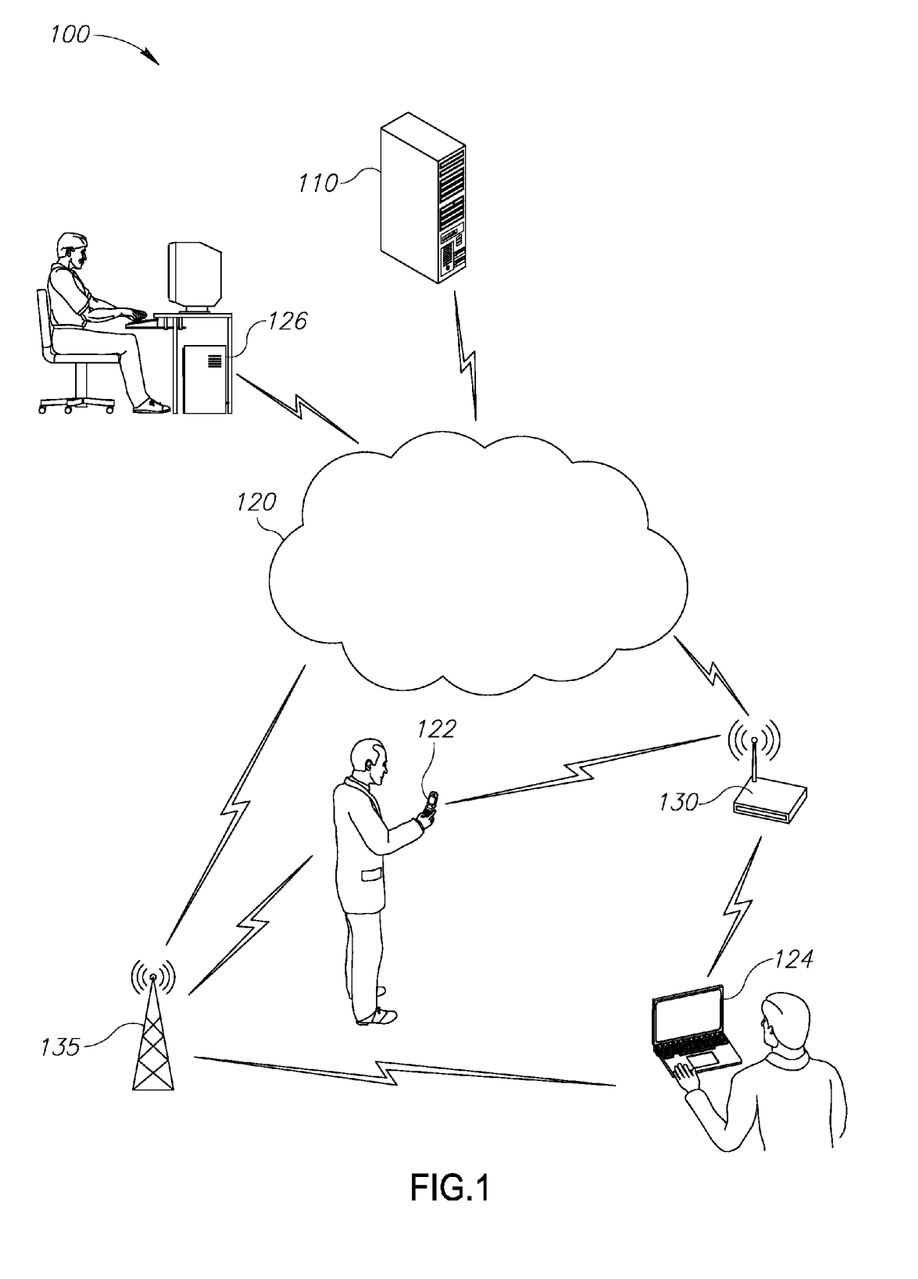
FIG. 1 shows a computerized environment, in accordance with some exemplary embodiments of the disclosed subject matter.

Referring now to FIG. 1 showing a computerized environment, in accordance with some exemplary embodiments of the disclosed subject matter. A computerized environment 100 may comprise a computerized network 120, such as a Local Area Network (LAN), a Wide Area Network (WAN), an intranet, the Internet, or the like, connecting directly or indirectly one or more computerized devices. Devices, such as 110, 122, 124, 126, may be connected to network 120 using a wired connection, a wireless connection, or the like.

A Content Delivery Network (CDN) 110 may be a computerized server operative to service content, such as media content. Media content may be video, audio, images, or the like. Media content may be compressed using lossy compression.

Lossy compression is a data encoding method which compresses data by discarding (losing) some of it. The procedure aims to minimize the amount of data that need to be held, handled, and/or transmitted by a computer. Typically, a substantial amount of data can be discarded before the result is sufficiently degraded to be noticed by the user. Furthermore, different loss rates may be utilized depending on a manner in which the media content is to be viewed. For example, in case of a video, if the video is to be displayed on a screen having a relatively low resolution, a relatively high loss rate may be used. On the other hand, if a HD display is used, a relatively low loss rate should be applied in order for a user not to notice the degraded quality.

A client 126, such as a personal computer, may be connected to network 120. A user of client 126 may utilize client 126 in order to download media content from CDN 110 and view the media content. The media content may be viewed in a streaming manner or in a non-streaming manner. As an example, the media content may be downloaded in a digital file from CDN 110 and viewed by a video player comprised by client 126. As another example, the media content may be streamed from CDN 110, such as the popular YouTube® service, and viewed using an appropriate player, such as a web-applet flash player.

A client 122 may be a mobile phone, a smartphone, an embedded device, a Personal Digital Assistant (PDA), or the like. Client 122 may be connected to network 120 in a wireless manner, a wired manner, or the like. Similarly, client 124 may be a computerized portable device, such as a laptop, a tablet computer, an e-book reader, or the like. Client 122 and/or client 124 may be connected to the network 120 via a network connection.

In one occasion the network connection may be a wireless router 130, such as for example a WiFi router. Wireless router 130 may be associated with a residential network of a user, with an office network, with a publicly available network, or the like. In a different occasion, the network connection may be via a cellular network 135. In some exemplary embodiments, client may switch between different network connections based on accessibility, available bandwidth, financial costs, or the like.

In some exemplary embodiments, there may be a fee charge for connecting via a network connection such as wireless router 130 and cellular network 135. In some exemplary embodiments, the fee may be based on bandwidth utilization. In some exemplary embodiments, there may be a different costs associated with connecting via wireless router 130 and cellular network 135, so that a user may have a preference therebetween based on costs. Additionally or alternatively, different network connections may provide different bandwidths (e.g., 100 Mb/sec via wireless router 130 and 1 Mb/sec via cellular network 135) and thus a user may have a preference therebetween based on the bandwidth.

A user utilizing a client, such as clients 122, 124, 126, may utilize an input device, such as a keyboard, a pointing device, a touch screen, a touch pad, or the like.

A user utilizing a client, such as clients 122, 124, 126, may decide to obtain a media content, such as from CDN 110. The user may indicate a first quality of the media content, which he would like to receive. The first quality may be selected from a predetermined set of qualities, may be selected based on a desired size of the media content, may be selected based on a time by which the media content is to be received, or the like.

In some exemplary embodiments, a user may indicate a change in desired quality after downloading has commenced. CDN 110 may be notified of the change and accordingly change the version being transmitted to the client. For example, consider a movie clip. An SD version of the movie clip is of size 100 MB, and an HD version of the movie clip is of size 200 MB. Given a connection of 1 MB/sec, the SD version can be downloaded within 100 seconds, while the HD version can be downloaded within 200 seconds. Assuming initially the user selects the SD version, and therefore the SD version was transmitted. After 50 seconds, the user may select the HD version, and therefore CDN 110 continues transmitting the content, but provides the HD version. After the downloading ends, the client retains a version of the media content having two portions: the first portion in SD quality and the second portion in HD quality.

In some exemplary embodiments, based on changes in communication link, network connection, bandwidth utilization, or the like, transmission rate between CDN 110 and the client may change. Based on the change, the version being transmitted may be changed to a version having higher/lower quality. In some exemplary embodiments, the user may be provided with an indication of the change in circumstances, and may be promoted to determine whether a change in quality is desired.

In some exemplary embodiments, CDN 110 may dynamically encode the media content using a lossy compression method in a dynamic manner so as to provide the client with a version adapted to its requirements (e.g., download duration time). In some exemplary embodiments, there may be different levels of "lossiness" to each method, and CDN 110 determines an appropriate one that will produce a media content version that can be transferred within a provided duration time, have a desired size, or the like. Additionally or alternatively, a user may select between the different levels of compressions available. Additionally or alternatively, the CDN 110 may retain pre-prepared version of the media content using different lossiness levels, and the user may select a version from the pre-prepared versions.

Figure 2:
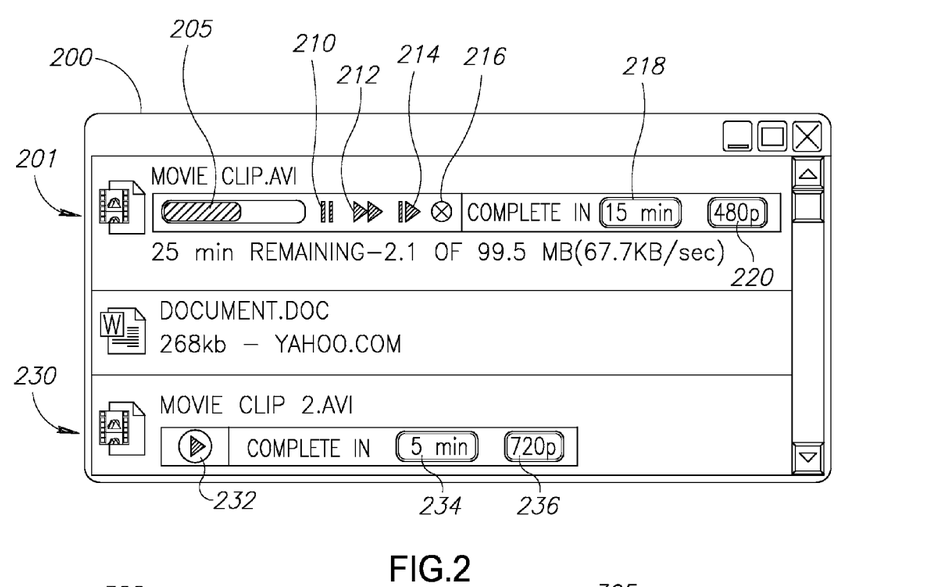
FIG. 2 shows a download widget, in accordance with some exemplary embodiments of the disclosed subject matter.

Referring now to FIG. 2 showing a download widget, in accordance with some exemplary embodiments of the disclosed subject matter. A download widget 200 may display files being downloaded, files that are about to be downloaded and/or files that were previously downloaded.

Entry 201 shows a file named "movie clip.avi" being downloaded. The file is a media content.

An input component 218 may be used by a user to determine a download duration time. For example, if 15 min is selected, and as under current transmission rate (67.7 KB/sec) the remaining data to be transferred (97.4 MB) would be downloaded within more than 15 minutes, the remaining portion of the media content may be downloaded with a reduced quality. Input component 218 may be responsive for setting an initial download duration time (either before downloading is commenced or afterwards) and for changing thereof. Input component 218 may be responsive to user input interaction. In some exemplary embodiments, if no user input is entered, input component 218 may initially indicate current estimated time of download (e.g., in the example of FIG. 2—25 min). In some exemplary embodiments, there may be a predetermined time granule units, such as a minute, half a minute, or the like, so that the user may enter duration that is measured using the time granule units (e.g., 10.5 minutes but not 10.7 minutes).

Additionally or alternatively, input component 218 may be utilized to indicate a time by which downloading is to be finished (e.g., 18:23).

A Quality Control Component (QCC) 220 may be operative to display an indication of current quality of the downloaded media content. For example, an indication of a resolution of a video (e.g., 480p, 800×600, "HD", or the like), a bit rate of media content, a lossiness level of media content or the like. In some exemplary embodiments, the indication may be provided to indicate to a user in a non-technical manner the quality, such as, for example, by indicating whether the video can be viewed using large screen HDTV, regular TV set, a mobile device, or the like.

QCC 220 may be responsive to user input and may be operative to switch between different versions of the media content, in accordance with the disclosed subject matter. In some exemplary embodiments, in response to a user clicking QCC 220, a list of possible alternative qualities may be displayed and a user may select a desired quality. The list may be based on predetermined set of versions retained by the CDN. Additionally or alternatively, the list may be populated based on current received quality and based on a granule quality unit, such that several better and worse versions can be selected (e.g., if current version is 420p, 720p and 1080p may be displayed as two better versions, and 320p and 200p may be displayed as versions having worse quality). In response to an interaction with QCC 220, a command to the CDN to switch a version based on the quality selection may be transmitted and the downloaded version may be switched to a version having substantially the selected quality. It will be understood that the quality levels may be estimation only useful as an indicative measurement to the user.

A progress bar 205 may be operative to display a portion of the media content that was downloaded. It will be noted that in non-streaming downloading methods, the packets of the media content that are downloaded may not necessarily be consecutive, and may be sporadically distributed.

A pause button 210 may be responsive to user input and may be operative to pause downloading of the media content. Thereafter, a resume button (not shown) may be displayed enabling the user to indicate that downloading should be resumed. Pause and resume of media content downloading may cause the client, such as 122, to indicate to CDN, such as 110, the determined action, and the CDN may act accordingly.

A Fast Forward (FF) button 212 may be response to user input and may be operative to cause downloading to be completed sooner. In response to an interaction by the user with FF button 212, the client may send an indication to the CDN to reduce quality of the media content, thereby reducing size of remaining data to be downloaded. In some exemplary embodiments, FF button 212 may be operative to decrease the time duration by one time unit. Additionally or alternatively, FF button 212 may be operative to decrease quality of the media content by one unit. The determination of the version to be sent to the client may be performed by the CDN based on receiving an updated time in response to interacting with FF button 212, based on receiving an updated quality in response to interacting with the FF, or the like. Additionally or alternatively, in response to interacting with the FF button 212, a command to the CDN indicating that the button was pressed may be sent, and the CDN may modify the version accordingly based on predetermined preferences.

In some exemplary embodiments, FF button 212 may be disabled in case there is no possibility to further reduce the quality. In some exemplary embodiments, a provider of media content may determine a minimal quality threshold and may not allow the media content to be downloaded in a quality below the minimal quality threshold.

Similarly to FF button 212 there may be a Slow Motion (SM) button 214. SM button may be responsive to user input and may be operative to cause downloading to be completed later, but with better quality. In some exemplary embodiments, SM button 214 may be disabled in case a version of highest available quality is being downloaded. In some exemplary embodiments, SM button 214 may be disabled in case the media content being downloaded is compressed in a lossless rate or is not compressed at all.

In some exemplary embodiments, FF button 212 and SM button 214 may be disabled in case the downloaded data is not media content or in case the CDN does not support dynamic modification of the loss rate of lossy compression encoding utilized and/or changing a version being sent to a version of different quality, in accordance with the disclosed subject matter. In some exemplary embodiments, the client and the CDN may utilize a communication protocol to determine if they are compatible and both capable of providing any of the functionalities disclosed in the disclosed subject matter.

A cancel button 216 may be responsive to user input and may be operative to cancel downloading.

Entry 230 shows a file named "movie clip 2.avi" that can be downloaded. The file is a media content. In some exemplary embodiments, a commence button 232 may be responsive to user input and may be operative to cause downloading to commence. In some exemplary embodiments, input component 234, similar to input component 218, and/or a QCC 236, similar to QCC 220, may be utilized to determine initial download duration time or quality of the downloaded media content. Based on selections by user a version to be downloaded may be determined and downloading thereof may begin in response to interacting with commence button 232.

Download widget 200 may be utilized in downloading non-media content, such as for example a document file. Optionally, QCC 220/236, input component 218/234, FF button 212 and SM button 214 may not be displayed with respect to downloading of non-media content. Alternatively, the components may be displayed but may be disabled in such cases.

In some exemplary embodiments, download widget 200 may be operative to notify the user (e.g., using a popup window, an alert, or similar indication) that network status has changed, and may invite the use to select a different quality, download duration time, or the like. For example, in case there the network connection has changed to a faster network connection, cheaper network connection or the like an alert may be issued. As another example, in case the transmission rate is changed for the better or for the worse, an indication may be provided. Optionally, indications may be provided when substantial change occur (i.e., change above a predetermined delta, where the delta may be absolute or a proportion).

Figure 3:
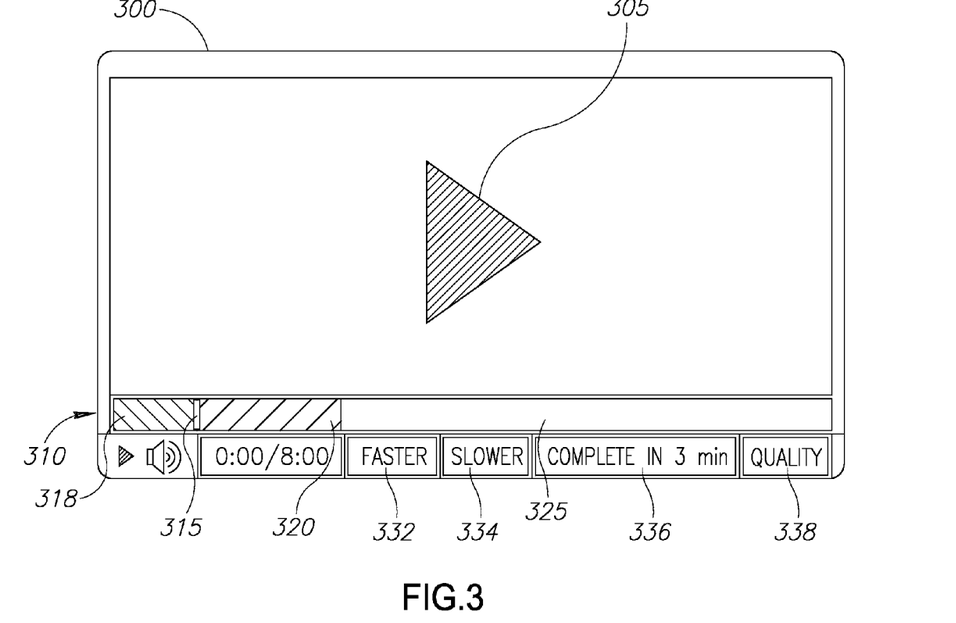
FIG. 3 shows a streaming viewer widget, in accordance with some exemplary embodiments of the disclosed subject matter.

Referring now to FIG. 3 showing a streaming viewer widget, in accordance with some exemplary embodiments of the disclosed subject matter. A widget 300 may be operative to download and display media content in a streaming manner. Widget 300 may be a part of a software tool, such as a player, may be embedded within a website, such as a client-side player applet, or the like.

Display 305 may be utilized to display the media content in case the media content is of video. Otherwise, display 305 may be disabled or absent. In some exemplary embodiments, in case the media content is not being watched the display may be used as an interactive component to resume playing of the media content.

A progress bar 310 may be utilized to indicate a portion of the media content that was downloaded and a portion that is yet to be downloaded (portion 325). In some exemplary embodiments, the portion that was downloaded may be split into a first portion that was played (318) and a second portion that was not yet played (320).

A location indicator 315 may indicate current location of the media content being displayed. In FIG. 3, in response to resuming playback of the media content, portion 320 will be shown.

Similarly to download widget 200, there may be component operative to control download duration time (input component 336, such as 218 of FIG. 2), quality of media content (QCC 338, such as 220 of FIG. 2; FF button 332, such as 212 of FIG. 2; SM button 334, such as 214 of FIG. 2).

In some exemplary embodiments, in response to changing quality of media content being downloaded, additional data that will be downloaded (e.g. with respect to portion 325 of the media content) may be downloaded in the modified quality.

In some exemplary embodiments, progress bar 310 may operative to indicate downloaded portions of different quality, such as by utilizing different color, a different pattern, or other visual indications.

It will be noted that in some exemplary embodiments, in case portion 325 is downloaded with a different quality than portions 318, 320, when the media content is played back from the beginning, the played media content may have two different qualities: a first quality when playing portions 318, 320 and a second quality when playing portion 325.

Figure 4:
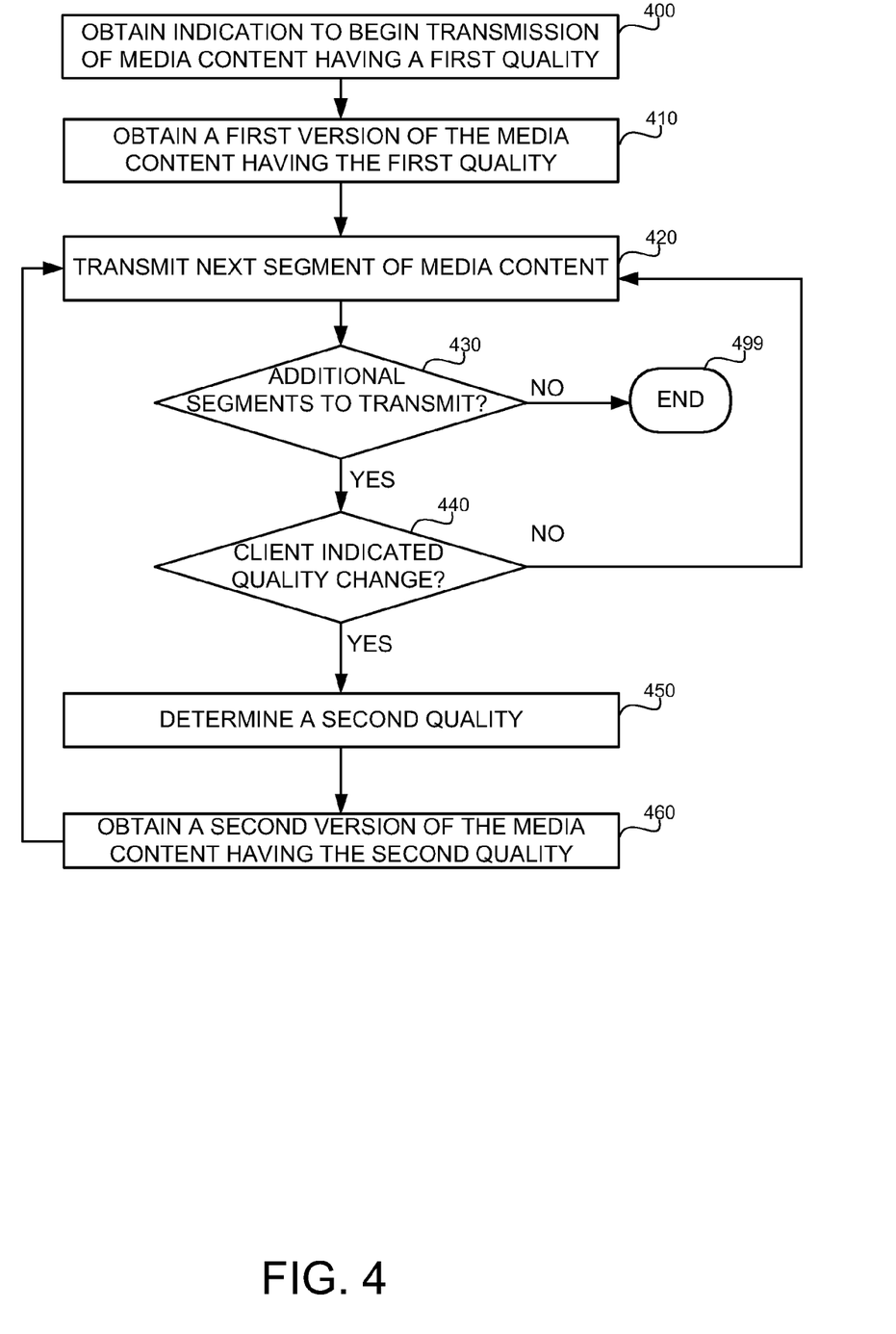
FIG. 4 shows a flowchart diagram of a method for transmitting media content, in accordance with some exemplary embodiments of the disclosed subject matter.

Referring now to FIG. 4 showing a flowchart diagram of a method for transmitting media content, in accordance with some exemplary embodiments of the disclosed subject matter. The method of FIG. 4 may be performed by a CDN, or other computerized device serving media content over a computerized network.

In step 400, an indication to begin transmission may be received from the client. A first quality of the media content is determined, such as based on the indication from the user, based on a default quality set for the CDN or for the media content, or the like. Optionally, the determination to begin transmission may be internal to the CDN and not based on an indication by the client.

In step 410, a first version of the media content having the first quality is obtained. The first version may be obtained from a data storage retaining the desired version. The first version may be obtained by encoding the first version on the fly from a version having a higher level of quality, or the like.

In step 420, transmittal of media content to client may commence. In some exemplary embodiments, the media content may be segmented into segments, such as of predetermined length (e.g., 5 seconds), size (1024 data blocks), or the like. Each segment may be sent separately, and optionally may have different quality. In case a portion of the media content was already transmitted next segment to be transmitted (i.e., next consecutive segment for streaming or any segment that was not yet transmitted for non-streaming) may be transmitted.

If all segments were transmitted (430), the method may end (499). Otherwise, a determination may be made in step 440. If a quality change was indicated by the client, the method may change the version accordingly. If no quality change is indicated, step 420 may be perfumed based on the same quality as before.

In step 450, a second quality may be determined, such as based on the quality change indication received from the client. The indication may indicate a desired quality. Additionally or alternatively, the indication may indicate a change of the current quality to a different quality, such as by one or more quality granule units, or the like.

In step 460, a second version of the media having the second quality may be obtained. The version may be obtained in any manner depicted with respect to step 410. In response to obtaining the second version, step 420 may be performed, and the next segment many be transmitted from the second version. Thus, the client receives at least a first segment having a first version and a second segment having a second version.

A person of ordinary skill in the art would realize that the method of FIG. 4 is not limited to one dynamic modification of the quality of the media content, and several such modifications may be performed iteratively.

Figure 5:
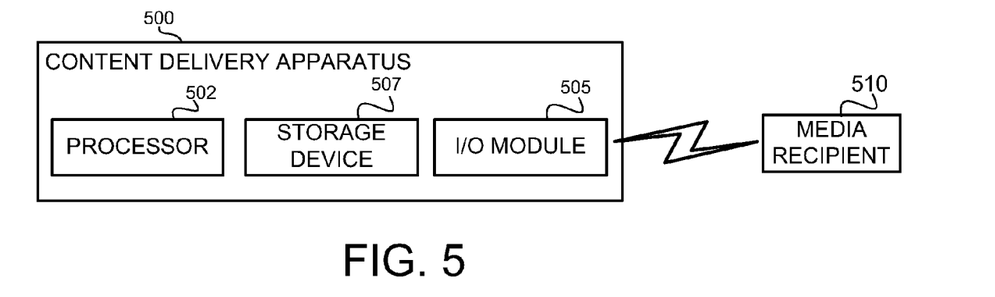
FIG. 5 shows a block diagram of an apparatus for transmitting media content, in accordance with some exemplary embodiments of the disclosed subject matter.

Referring now to FIG. 5 showing a block diagram of an apparatus for transmitting media content, in accordance with some exemplary embodiments of the disclosed subject matter. A content delivery apparatus 500, such as CDN 110, may be operative to perform a method such as depicted in FIG. 4.

Apparatus 500 may comprise a processor 502. Processor 502 may be a Central Processing Unit (CPU), a microprocessor, an electronic circuit, an Integrated Circuit (IC) or the like. Alternatively, apparatus 500 can be implemented as firmware written for or ported to a specific processor such as Digital Signal Processor (DSP) or microcontrollers, or can be implemented as hardware or configurable hardware such as field programmable gate array (FPGA) or application specific integrated circuit (ASIC). Processor 502 may be utilized to perform computations required by apparatus 500 or any of it subcomponents.

Apparatus 500 may comprise an Input/Output (I/O) module 505, such as useful for communicating over computerized network 120 with media recipient 510, such as clients 122, 124, 126.

Apparatus 500 may comprise one or more storage devices such as storage device 307. Storage device 507 may be persistent or volatile. For example, storage device 507 can be a Flash disk, a Random Access Memory (RAM), a memory chip, an optical storage device such as a CD, a DVD, or a laser disk; a magnetic storage device such as a tape, a hard disk, Storage Area Network (SAN), a Network Attached Storage (NAS), or others; a semiconductor storage device such as Flash device, memory stick, or the like. In some exemplary embodiments, storage device 507 may retain program code operative to cause processor 502 to perform acts associated with any of the steps shown in FIG. 4 above. In some exemplary embodiments, original media content and/or pre-prepared versions of the media content may be retained in the storage device 507 and transmitted to the media recipient 510 by the apparatus 500.

Figure 6:
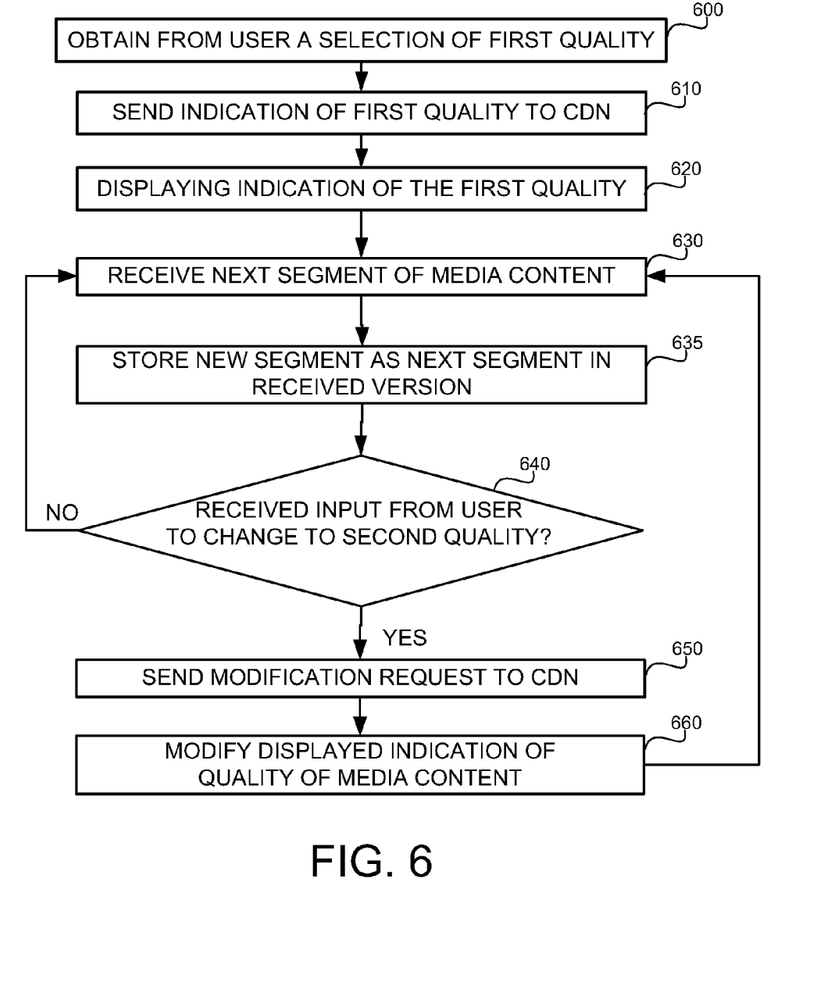
FIG. 6 shows a flow chart diagram of a method performed by a client receiving content, in accordance with some exemplary embodiments of the disclosed subject matter.

Referring now to FIG. 6 showing a flow chart diagram of a method performed by a client receiving content, in accordance with some exemplary embodiments of the disclosed subject matter.

In step 600, a user may indicate a section of a first quality, such as using QCC 220.

In step 610, the first quality may be sent to a computerized device operative to transmit the media content. The computerized device may perform a process similar to that depicted in FIG. 4. For simplicity, the device is referred to as CDN.

In step 620, an indication of quality of media content may be displayed. The indication may be displayed using QCC, such as 220. The quality may be computed by the client, may be obtained from the CDN after the CDN determines a version to be transmitted, or may be based on a rule of thumb, such as based on a ratio between duration of media content and size of the version.

In step 630, the media content may be received from the CDN. The media content may be received segment by segment. In response to receiving a segment, the new segment is stored in a received version retained by the client in a computerized memory, such as persistent or volatile memory.

If during download of the media content a user provides an input (640), step 650 may be performed. The user may interact with a component such as FF button 212, SM button 214, input component 218, QCC 220 or the like. In step 650, a modification request may be transmitted to the CDN. The request may be to modify download duration time (e.g. to change it by a time unit; to change it to a new download duration time; or the like), to modify the quality, or the like.

In step 660, the displayed indication of quality may be modified accordingly to the modification request of step 650.

Next segment to be downloaded may be downloaded in step 630, where the segment may be of a version in accordance with the modification request.

In some exemplary embodiments, the version retained by the client after the method of FIG. 6 ends comprises segments of different versions in the CDN.

In some exemplary embodiments, after downloading is finished, the client may request from the CDN to re-transmit several segment, such as those having a relatively low quality. For example, if the user initially selected SD quality, and after downloading commenced, changed to an HD quality, the client may selectively re-download the segments that were received in SD quality. Thereby, if the user would like to consume the media content, he can do so at any time. However, if sufficient time is given, the user may consume a media content having a better quality than that originally downloaded.

In some exemplary embodiments, selective re-downloading may be performed in response to a determination that the user is not currently consuming the media content. In some exemplary embodiments, if the user is consuming the media content, re-downloading may be performed with respect to portions of the media content that were not yet consumed. Additionally or alternatively, re-downloading may be performed with respect to portions of the media content that are estimated to not be consumed by the time the re-downloading is finished. As an example, the segment beginning in five minutes from current viewed location of a video may be re-downloaded instead of the segment beginning in two minutes, if download time is estimated to exceed two minutes by not exceed five minutes. In some exemplary embodiments, selective re-downloading may be performed in case the client is idle, in case the client is not playing the media content, in case bandwidth utilization by the client is below a predetermined threshold, in case the costs of bandwidth utilization are below a predetermined cost, or the like. In some exemplary embodiments, only in case the client is connected via a network connection that is not associated with downloading costs, the client may selective re-download segments.

In some exemplary embodiments, the selective re-downloading of segments may reuse previously received data. For example, the versions may be successive refinement of one another, thus a delta of information from the previously downloaded segment may be downloaded and used to generate a segment having a better quality. In some exemplary embodiments, the downloaded data may be added to the previously downloaded segment thus providing the segment having a better quality. Ertem Tuncel et al "Additive Successive Refinement" IEEE TRANSACTIONS ON INFORMATION THEORY, vol. 49, no. 8, 2003, which is hereby incorporated by reference, discloses one exemplary successive refinement method. It will be noted that a person of ordinary skill in the art would be able to utilize alternative methods.

The flowchart and block diagrams in the figures illustrate the architecture, functionality, and operation of possible implementations of systems, methods and computer program products according to various embodiments of the present disclosure. In this regard, each block in the flowchart and some of the blocks in the block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, any non-transitory computer-readable medium, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method comprising:
receiving, by a client, a first portion of a media content having a first quality;
in response to an indication from a user, determining a change of quality to a second quality, the indication from the user causing the client to cease receiving the first portion at a first point in time of the media content;
receiving, by the client, a second portion of the media content having the second quality, the second portion beginning at a second point in time of the media content that is after the first point in time;
whereby the client is enabled to display to the user received media content that comprises portions having different qualities; and
in response to receiving the received media content, selectively re-downloading a portion of the received media content that was previously downloaded in a lower quality, wherein the portion is of a higher quality than the lower quality.

2. The computer-implemented method of claim 1, wherein the indication from the user is provided after receiving the media content by the client has commenced.

3. The computer-implemented method of claim 1, further comprises:
outputting an indication of the first quality; and
in response to the indication from the user, outputting an indication of the second quality.

4. The computer-implemented method of claim 1, wherein the indication from the user is an indication to change the first quality by one or more quality granule units.

5. The computer-implemented method of claim 1, wherein the media content is being received in a transmission method; wherein the transmission method is selected from the group consisting of:
 streaming transmission of the media content, and
 non-streaming transmission of the media content.

6. The computer-implemented method of claim 1, wherein the indication from the user is responsive to a notification to a user, wherein the notification is associated with a modification of a communication link of the client.

7. The computer-implemented method of claim 6, wherein the modification of the communication link is a change in download speed to the client.

8. The computer-implemented method of claim 6, wherein the modification of the communication link is switching from a first network connection to a second network connection.

9. The computer-implemented method of claim 8, wherein either the first or second network connection is a cellular network connection.

10. The computer-implemented method of claim 8, wherein either the first or second network connection is associated with higher costs of downloading data.

11. The computer-implemented method of claim 1, wherein in response to receiving the received media content, selectively receiving data associated with at least one previously received segment of the received media content, wherein the data is useful to be added to the previously received segment to provide an enhanced segment, wherein the enhanced segment is of a higher quality than a quality of the previously received segment.

12. A computerized apparatus comprising a processor, adapted to perform the computer-implemented method of claim 1.

13. A computer program product for enabling a user of a computerized device to select quality of media content, the computer program product comprising:
 program code stored on a non-transitory computer readable medium;
 wherein the program code is operative to display a Graphical User Interface (GUI) widget on a display of the computerized device;
 wherein the GUI widget is responsive to an indication from the user to change quality of the media content after a first portion of the media content has been downloaded, the indication from the user causing the download of the first portion to stop at a first point in time of the media content, whereby the media content downloaded to a client comprises the first portion having a first quality and a second portion having a second quality, the second portion beginning at a second point in time of the media content that is after the first point in time, and the GUI widget is enabled to display to the user the media content; and
 wherein in response to receiving the received media content, the client selectively re-downloading a portion of the received media content that was previously downloaded in a lower quality, wherein the portion is of a higher quality than the lower quality.

14. The computer program product of claim 13, wherein the GUI widget further comprises a quality display component operative to indicate currently received quality of the media content.

15. The computer program product of claim 13, wherein the GUI widget is configured to indicate to the user portions of the media content having different qualities.

16. The computer program product of claim 13, wherein the GUI widget further comprises at least one of the following:
 a faster input component operative to indicate a decrease in quality by a quality unit of the media content, wherein the decrease by the quality unit is with respect to a predetermined quality granule;
 a slower input component operative to indicate an increase in quality by the quality unit of the media content.

17. The computer program product of claim 13, wherein the GUI widget is further operative to provide a notification to the user in response to a modification of a communication link of the computerized device.

* * * * *